Jan. 20, 1970 T. C. PENN 3,491,281
BLOCKING OSCILLATOR POWER SUPPLY
Original Filed Oct. 7, 1964 5 Sheets-Sheet 1
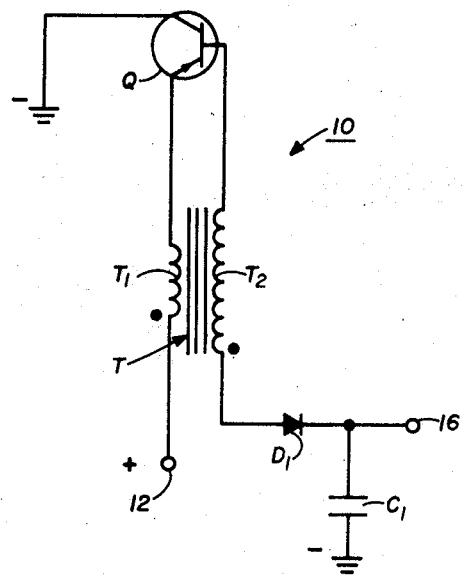
FIG. 1
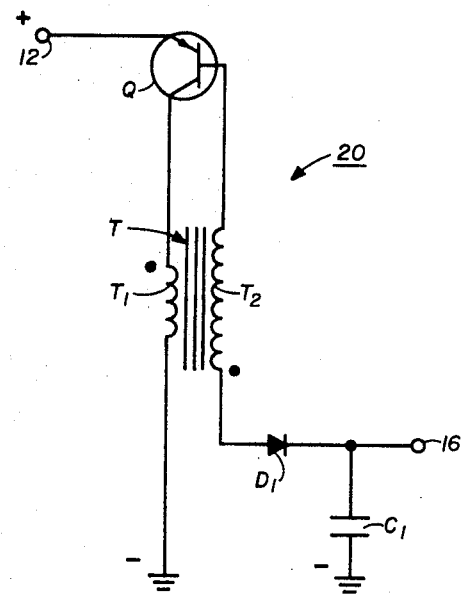
FIG. 2
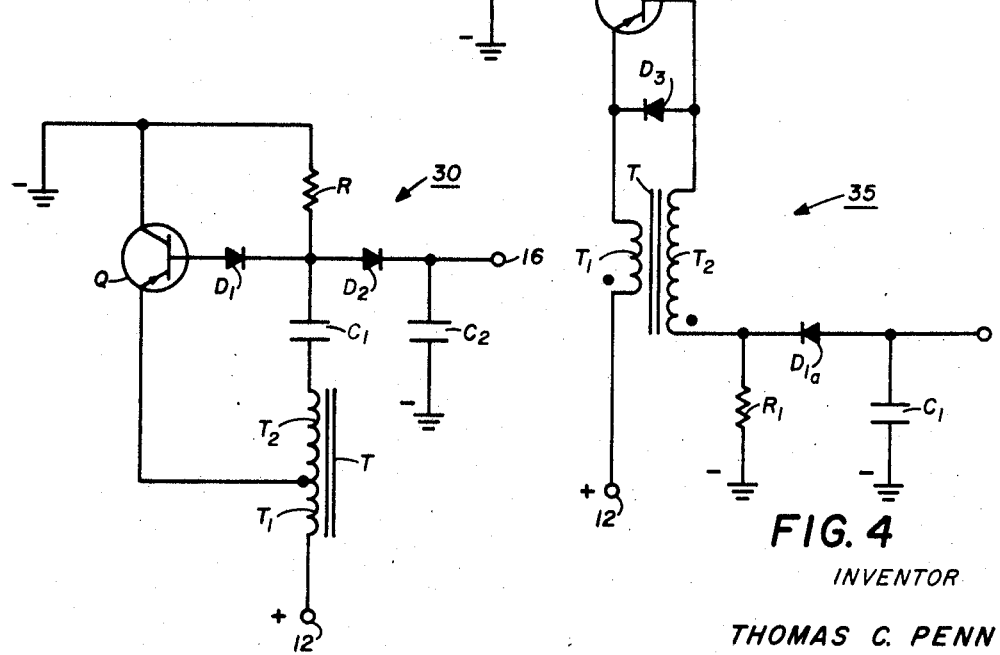
FIG. 3
FIG. 4
INVENTOR
THOMAS C. PENN
*Robert J. Crawford*
ATTORNEY United States Patent Office 3,491,281
Patented Jan. 20, 1970

3,491,281
BLOCKING OSCILLATOR POWER SUPPLY
Thomas C. Penn, Richardson, Tex., assignor to Texas Instruments Incorporated, Dallas, Tex., a corporation of Delaware
Original application Oct. 7, 1964, Ser. No. 402,119, now Patent No. 3,334,619, dated Aug. 8, 1967. Divided and this application Apr. 3, 1967, Ser. No. 645,077
Int. Cl. H02m 3/22; H03k 3/30
U.S. Cl. 320—1                    23 Claims

ABSTRACT OF THE DISCLOSURE

Disclosed is a blocking oscillator power supply for use in transistorized automotive ignition systems, electric fences, and the like, comprising a transistor circuit having a voltage step-up transformer with the induced voltage side connected in the base circuit, a positive feedback loop from the base circuit to the collector-emitter circuit, and a capacitive load in the base circuit. This novel circuit achieves voltages much higher than the supply voltage; for example, a 300 v. output can be achieved with only a 12 v. supply voltage.

---

This application is a division of my application, Ser. No. 402,119, filed Oct. 7, 1964, entitled Capacitive Discharge Ignition System and Blocking Oscillator Power Supply, and now U.S. Patent No. 3,334,619, dated Aug. 8, 1967.

The present invention relates generally to ignition systems for internal combustion engines, and more particularly, but not by way of limitation, relates to a transistorized automotive ignition system wherein a capacitor is charged by an improved blocking oscillator circuit and then discharged through the primary winding of the ignition coil of the conventional automative ignition system by an improved discharge circuit.

The traditional ignition system of a automotive internal combustion engines consists essentially of a first series circuit connected across the auto battery and includes the primary winding of the ignition coil and the breaker points which are mechanically coupled to the crankshaft of the engine. A second series circuit includes the secondary winding of the ignition coil, a distributor switch mechanically coupled to the crankshaft of the engine for selecting the proper spark plug, and the spark gap of the selected spark plug. When the breaker points open, the collapsing flux in the ignition coil induces a high voltage in the secondary circuit which generates a spark across the gap of the spark plug to ignite the fuel-air mixture in the cylinder.

The traditional ignition system has been utilized for years in the automotive industry and is largely successful. However, such a system delivers limited power at the spark gap. Further, the time at which the plug fires varies considerably with variations in the cylinder pressure and fuel-air ratio, primarily because of the limited voltage available at the spark gap. The voltage and power which can ultimately be delivered to the spark plug are limited by the current capacity of the breaker points and the power dissipated in the coil. High current produces arcing which burns the points and shortens their useful life. Arcing is reduced by a condenser connected across the breaker points, but a condenser of sufficient size to handle a larger current also slows the rate at which the current can build up in the ignition coil when the points close. If too large a condenser is used, the flux in the ignition coil will not build to a maximum at high engine r.p.m. so that reduced ignition power at high speed results.

Since the advent of transistors, considerable afford has been directed toward perfecting a transistorized ignition system which has practical advantages over the traditional ignition system. In general, this effort has been directed primarily toward reducing the current through the breaker points by using a transistor to control the current through the primary winding of the coil. But the transistorized systems heretofore proposed which employ components of a reasonably low cost have little advantage over the conventional system other than the reduction of wear of the breaker contacts as a result of a reduction in the current flow through the contacts. This is offset by the fact that the low current through the contacts is often insufficient to burn through moisture or oxide on the points such that, in adverse weather, the engine cannot be started. Further, these system in general trade current at the spark gap for a higher voltage at the spark gap and as a result tend to deliver even less useful power to the spark gap than the traditional system.

A spark generation system utilizing a capacitor storage and discharge system has also been proposed. Various types of power supplies have been employed to charge the capacitor. Thyratrons and gate-controlled rectifiers have been used to discharge the capacitor through the primary winding of the ignition coil at the appropriate time. Such a system can provide considerably more useful power at the spark gap than either the tradition system or the systems wherein transistors carry the current through the ignition coil, but the capacitive systems have heretofore been too complex and expensive for practical application.

Therefore, an important object of this invention is to provide an improved ignition system for an internal combustion engine.

Another object of the invention is to provide an improved blocking oscillator power supply for use in the ignition system and for any other desired application.

Another object of the invention is to provide an ignition system for an internal combustion engine which delivers increased voltage and power to the spark plugs.

A further object is to provide a capacitive discharge ignition system which is very simple, yet is sufficient reliable to permit the use of inexpensive components.

Still another object is to provide an ignition system which utilizes the components of the traditional ignition system now used in automobiles.

A further object of the invention is to provide a system of the type described which can be disconnected in the event of failure and the traditional system utilized.

Yet another object is to provide a capacitive discharge ignition system utilizing a free-running blocking oscillator power supply to insure a full charge on the capacitor even at low engine r.p.m.

Still another object is to provide an ignition system of the type described which, to promote starting in cold weather, produces a train of sparks at the spark plugs when the engine starter is energized.

A further object is to provide an ignition system wherein the current through the power supply is directly proportional to the engine r.p.m. and an ammeter may be calibrated as a tachometer.

Yet another object is to provide a blocking oscillator power supply which is exceedingly simple and employs a minimum number of inexpensive components, yet is free-running and thermally stable.

Another object is to provide a single-shot blocking oscillator for recharging a capacitor each time the capacitor is discharged.

A further object is to provide a blocking oscillator having a high voltage gain.

Still another object is to provide a blocking oscillator particularly adapted to charge a capacitive load.

A further object of the invention is to provide a blocking oscillator for charging a capacitor to a voltage many times the input voltage.

Another object is to provide a blocking oscillator which will operate either in the one-shot or free-run modes.

These and other objects of the invention are accomplished by an ignition system wherein a capacitor is charged by a novel blocking oscillator power supply conprising a transistor the base circuit of which is connected to the capacitor through a diode and which is regeneratively coupled to the emitter-collector circuit of the transistor by a voltage step-up transformer having the primary winding in the emitter-collector circuit and the secondary winding in the base circuit. The increased voltage induced in the base circuit both charges the capacitor to several hundred volts from a 12 volt source and also rapidly saturates the transistor until further current increase is prevented by saturation of the base circuit. The capacitor is then discharged through the primary winding of the ignition coil or other transformer to fire the spark plug selected by the distributor.

In accordance with one important aspect of the invention, the blocking oscillator power supply circuit is made to free-run by a second capacitor interconnecting the base current between the diode and the base and the emitter-collector circuit. The combined voltage stored in the second capacitor and induced in the secondary winding during the flyback will reverse-bias the base of the transistor at a very high voltage to make the transistor thermally stable and also cause the blocking oscillator to free-run.

In accordance with another aspect of the invention the discharge circuit for the capacitor includes a gate-controlled rectifier controlled by an improved trigger circuit which is sufficiently reliable in operation to permit the use of inexpensive components and which also tends to compensate for bounce of the ignition points, yet provide a sufficient initial current through the points to burn off oxide and moisture.

Another aspect of the invention contemplates an ignition system wherein the capacitor is repeatedly discharged through the primary winding of the ignition coil to produce a train of sparks across the spark gap during the period the ignition point are open and the starter engaged.

In accordance with another aspect of the invention, the transistor of the blocking oscillator is thermally stabilized using conventional techniques, and may be made to free-run even when charging a capacitor by providing a circuit for dissipation of the energy stored in the transformer and for additional base current to start the regenerative process. The blocking oscillator may also be made to drive a load during the flyback of the transformer and the discharge of the capacitor so as to produce an even greater voltage output for a given voltage input. The blocking oscillator power supply may be used to drive a capacitive, resistive, or inductive load or any combination thereof.

A more detailed understanding of the various aspects of the present invention as well as additional objects and advantages of the invention may be obtained from a perusal of the following detailed description and accompanying drawings, wherein:

FIGURE 1 is a circuit diagram of the blocking oscillator power supply of the present invention;

FIGURE 2 is a circuit diagram of another embodiment of the blocking oscillator power supply of the present invention;

FIGURE 3 is a circuit diagram of still another embodiment of the blocking oscillator power supply of the present invention which operates in the flyback mode;

FIGURE 4 is a circuit diagram of yet another embodiment of the blocking oscillator power supply of this invention which also operates in the flyback mode;

Figure 14:
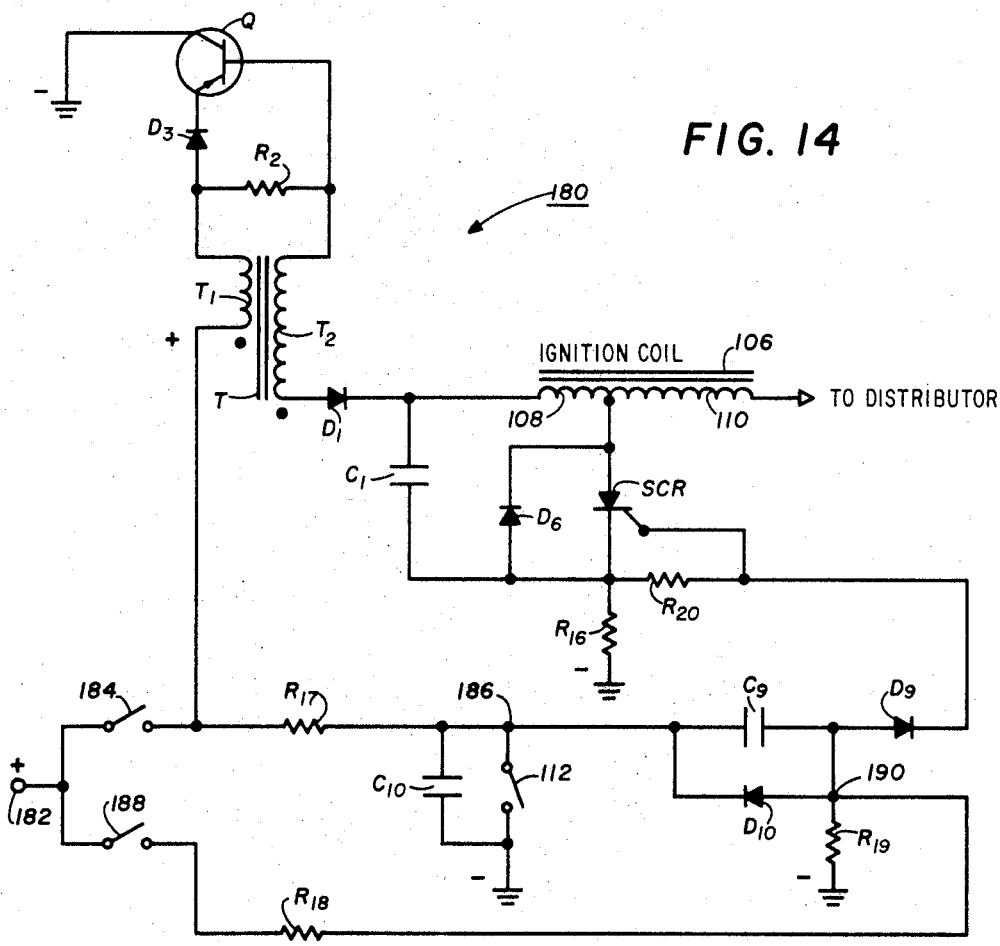
Figure 15:
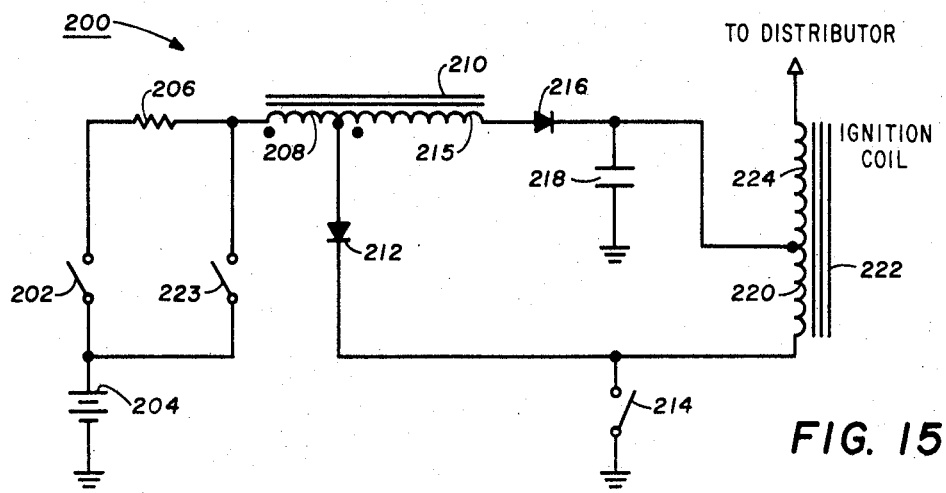

FIGURE 14 is a circuit diagram of a further embodiment of the ignition system of the present invention; and, The ignition system of the present invention can best be understood after a detailed discussion of the novel blocking oscillator power supply illustrated in various embodiments and refinements in FIGURES 1–10. Referring now to FIGURE 1, a novel blocking oscillator power supply constructed in accordance with the present invention is indicated generally by the reference numeral 10. The blocking oscillator power supply 10 is comprised of a transistor Q and a voltage step-up transformer T in which the secondary winding $T_2$ has a greater number of turns than the primary winding $T_1$. The emitter of transistor Q is connected through the primary winding $T_1$ to a positive voltage supply terminal 12 and the collector is connected to ground such that the primary winding $T_1$ is connected in a series D.C. power circuit including the emitter-collector circuit of the transistor Q. The base circuit of the transistor Q is regeneratively coupled to the emitter-collector circuit through the secondary winding $T_2$ and also drives the load which in the case illustrated is a capacitor $C_1$ which is charged through a diode $D_1$. The other side of the capacitor $C_1$ is connected to ground so as to form a second series circuit interconnecting the base of the transistor and the D.C. power circuit. Although the second series circuit interconnects the base and the emitter of the transistor Q by way of the battery 12, the circuit may be connected from the base directly back to the emitter or back to the positive terminal 12 because of the voltage induced in the secondary winding $T_2$ as will hereafter be more evident. An output terminal 16 may be connected to drive any number of loads by discharge of the capacitor such as the ignition systems which will hereafter be described, photo-flash units, stroboscopes, electric fences and sweep circuits for oscilloscopes, television sets, and similar devices.

In order to understand the operation of the blocking oscillator power supply 10, assume that the capacitor $C_1$ is discharged and that no emitter power voltage is applied to the positive terminal 12. When a positive voltage is applied to the terminal 12, the emitter-base diode within the transistor Q will conduct through the primary winding $T_1$, the secondary winding $T_2$, diode $D_1$ and capacitor $C_1$. This base current flow produces collector current through $T_1$ as well and induces a voltage in the secondary winding $T_2$ of a polarity which will make the base become more negative. This increases the collector current and therefore increases the current through the primary winding of $T_1$ to further increase the voltage induced in the secondary winding $T_2$. Thus the transistor Q very rapidly goes to saturation and substantially the full positive voltage is applied across the primary winding $T_1$. This induces a high voltage on $T_2$ which charges capacitor $C_1$ by the base current of transistor Q. When the losses of the charging circuit for the capacitor $C_1$ approach the gain, i.e., when the feedback loop gain approaches unity, the regenerative process ceases and the transistor Q is very rapidly turned off. The diode $D_1$ has a very high resistance and prevents the discharge of capacitor $C_1$ and incidentally protects transistor Q from the reverse polarity voltage, or flyback voltage, generated in the secondary winding $T_2$ when the flux in the core of the transformer collapses. No further current can pass through the base circuit of the transistor Q because the high voltage impressed across the capacitor $C_1$ back-biases the diode $D_1$. The voltage to which the capacitor $C_1$ may be charged is determined by the windings ratio of the transformer T. In accordance with an important aspect of this invention, the number of turns of the secondary winding $T_2$ is preferably substantially greater than the number of turns of the primary winding $T_1$ so that the voltage induced in the base circuit materially exceeds the voltage in the emitter-collector circuit. For example, 12 volts applied at the terminal 12 may easily produce a charge of several hundred volts (400 v. in one embodiment) across the capacitor $C_1$. When the capacitor $C_1$ is discharged through a load attached to the output terminal 16, the transistor Q will again conduct and recharge the capacitor.

Referring now to FIGURE 2, a blocking oscillator power supply circuit 20 is substantially identical to the circut 10 and corresponding components are therefore designated by corresponding reference characters. In the circuit 20 the primary winding $T_1$ of the transformer T is connected in the series power circuit between the collector of the transistor Q and ground, rather than between the emitter and the positive voltage terminal 12 as in the circuit 10 of FIGURE 1. However, the base circuit is still regeneratively coupled to the emitter-collector circuit of the transistor Q and is still connected through the diode $D_1$ to charge the capacitor $C_1$. The operation of the circuit 20 is identical to the operation of the circuit 10 except that only collector current flows through primary winding $T_1$ in circuit 20 initially. In general, the circuit 10 will be preferred over the circuit 20 because in many transistors the collector is common to the case and therefore to ground. The circuit 10 permits the transistor Q to be directly coupled to a heat sink.

Referring now to FIGURE 3, another blocking oscillator power supply constructed in accordance with the present invention is indicated generally by the reference numeral 30. The circuit 30 is substantially the same as the circuit 10 and 20 and corresponding components are therefore designated by corresponding reference characters. The circuit 30 differs from the circuit 10 and 20 in that the transformer T is an autotransformer so that the base circuit including the diode $D_1$, the capacitor $C_1$ and the secondary winding $T_2$ are connected back to the emitter of transistor Q. The capacitor $C_1$ is then discharged through a second diode $D_2$ to charge a second capacitor $C_2$. Also, a resistor $R_1$ connects the base circuit of transistor Q to ground through the diode $D_1$.

In the operation of the circuit 30, assuming first that capacitors $C_1$ and $C_2$ are not charged, the emitter-base diode of transistor Q conducts through the primary winding $T_1$, diodes $D_1$ and $D_2$ and capacitor $C_2$ until the capacitor is fully charged. Base current flow in transistor Q produces collector current through $T_1$ and induces a voltage in the secondary winding $T_2$ in the same manner described in connection with the circuit 10. This increases the current in the emitter-collector circuit and therefore in the primary winding $T_1$ to further increase the base current and very rapidly saturate the transistor Q and charge the capacitor $C_1$. During the charging of capacitor $C_1$, the diode $D_2$ is back-biased by the voltage induced in the secondary winding $T_2$ and the capacitor $C_2$ is not fully charged. However, when the regenerative action ceases, the collapsing flux in the transformer T reverses the polarity of the voltage induced in the secondary winding $T_2$. The flyback voltage thus induced across the secondary winding $T_2$ is added to the voltage stored by capacitor $C_1$ to forward-bias the diode $D_2$ and charge the capacitor $C_2$ to the combined voltages. Diode $D_1$ is back-biased and prevents transistor Q from being damaged during this high voltage phase.

If the resistor R is omitted from the circuit 30, the capacitor $C_2$ will be charged during the flyback from the first firing of the transistor and the capacitor $C_1$ will be charged during the second firing of the transistor. However, once the capacitor $C_2$ is charged, the capacitor $C_1$ cannot discharge until capacitor $C_2$ is discharged, and both capacitors will be discharged through the terminal 16. However, with the resistor R connected as shown, the capacitor $C_1$ will discharge to ground even when capacitor $C_2$ is charged and the blocking oscillator will free-run and maintain a full charge on the capacitor $C_2$.

The circuit 30 is capable of charging the capacitor $C_2$ to a much higher voltage for a given voltage across the primary winding of a transformer of a given turns ratio than either of the circuits 10 or 20 as a result of adding the flyback voltage of the secondary winding $T_2$ to the voltage stored by the capacitor $C_1$ in said circuits 10 and 20. Using the same transformer T as in the circuits 10 and 20, the capacitor $C_2$ of circuit 30 has been charged to 800 volts from a 6 volt supply applied to terminal 12 as compared to 400 volts on the capacitor $C_1$ from a 12 volt supply applied to the terminal 12 in the circuits 10 and 20. Thus the circuit 30 is particularly suited for use in flash tube applications, electric fences, and the like, or other cases where a low voltage is applied to the terminal 12.

Referring now to FIGURE 4, another blocking oscillator power supply constructed in accordance with the present invention is indicated generally by the reference numeral 35. The circuit 35 is similar to the circuits 10 and 20 heretofore described, and corresponding components are therefore designated by corresponding reference characters. However, the circuit 35 differs from the circuits 10 and 20 in that the capacitor $C_1$ is charged during the flyback of the transformer T rather than during the forward conduction of the transistor Q. Further, a resistor $R_1$ interconnecting the base circuit between the secondary winding $T_2$ and the diode $D_1$ provides a conduction path for forward base current and also makes the blocking oscillator circuit free-run. A diode $D_3$ connected from base to emitter of transistor Q provides a path for the flyback current and prevents damage to transistor Q. The base of the transistor Q is connected through the secondary winding $T_2$ and the resistor $R_1$ to ground. The diode $D_{1a}$ is reversed to the diode $D_1$ in circuits 10, 20 and 30 and connects the capacitor $C_1$ to the junction between the resistor $R_1$ and the secondary winding $T_2$. The other side of the capacitor $C_1$ is connected to ground.

When the positive voltage is applied to the terminal 12 in FIGURE 4, the base current through the primary winding $T_1$ produces collector current which induces a greater voltage in the secondary winding $T_2$ so as to make the base of the transistor more negative and thereby very rapidly saturates the transistor Q. During the conduction of the transistor Q, the voltage induced in the secondary winding $T_2$ reverse-biases the diode $D_{1a}$ and the current passes through the resistor $R_1$ to ground. When the regenerative process ceases and the flux in the transformer collapses, the flyback voltage induced in the secondary winding $T_2$ has a reversed polarity and the diode $D_{1a}$ is then forward-biased and the capacitor $C_1$ is charged through the circuit from ground, through capacitor $C_1$, diode $D_{1a}$, secondary winding $T_2$, diode $D_3$, primary winding $T_1$ and the battery connected between terminal 12 and ground. As mentioned, diode $D_3$ prevents transistor Q from being damaged during the charging of capacitor $C_1$. The diode $D_{1a}$ then prevents discharge of the capacitor $C_1$. However, the resistor $R_1$ permits the flux in the transformer T to collapse such that base current in the transistor Q will start the regenerative process to again fire the transistor. The blocking oscillator circuit will thus free-run and the diode $D_{1a}$ will conduct to the extent that the flyback voltage induced in the secondary finding by the collapsing flux exceeds the voltage stored on the capacitor $C_1$. The rate at which the blocking oscillator will fire is determined by the value of the resistor $R_1$. The capacitor $C_1$ may be discharged through output terminal 16 by any suitable circuit, such as will hereafter be described in greater detail.

Figure 5:
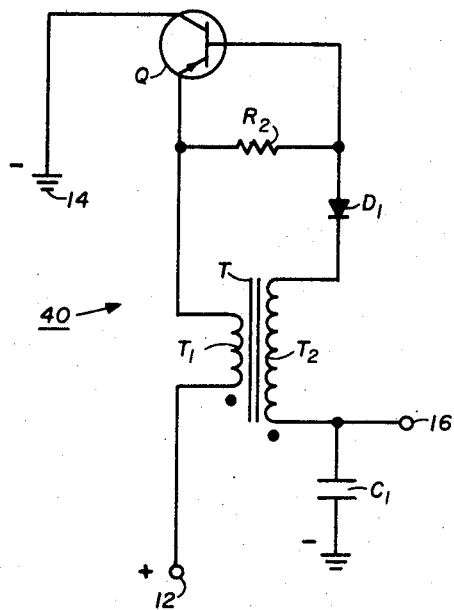
FIGURE 5 is a circuit diagram of a modification of the circuit illustrated in FIGURE 1 having improved thermal stability.

Referring now to FIGURE 5, a refinement of the circuit 10 of FIGURE 1 to insure thermal stability of the transistor Q is indicated generally by the reference numeral 40. The circuit 40 utilizes the same components as the circuit 10 and these components are designated by the same reference characters. A resistor $R_2$ is connected from the base to the emitter of the transistor Q. Also, the diode $D_1$ is connected between the base of transistor Q and the secondary winding $T_2$, rather than between the secondary winding $T_2$ and the capacitor $C_1$. The effect of diode $D_1$ is, however, the same as in FIGURE 10.

The purpose of the resistor $R_2$ is to improve the thermal stability of the transistor Q. Except during the forward pulse through the transistor Q, the base of the transistor is essentially open due to the high impedance afforded by the backbiased diode $D_1$, and is therefore subject to thermal runaway. The resistor $R_2$ connecting the base to the emitter reduces this impedance and promotes thermal stability. However, if the resistance of the resistor $R_2$ is decreased, the current gain required in the transistor Q is increased.

Figure 6:
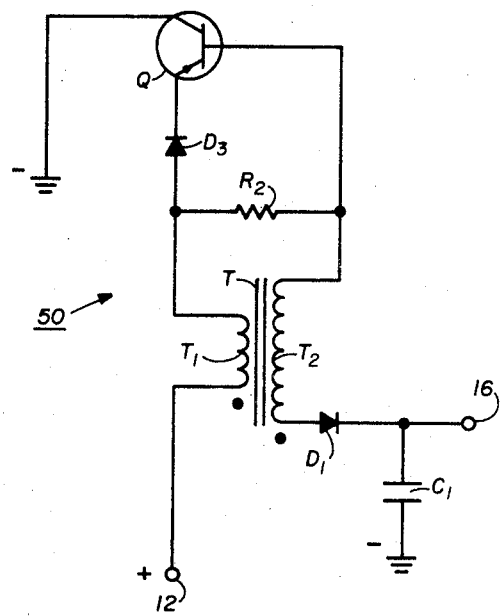
FIGURE 6 is a circuit diagram of still another modification of the circuit of FIGURE 1 having improved thermal stability.

The resistance of the resistor $R_2$ connected between the base and emitter can be increased so as to reduce the required gain by the inclusion of the diode $D_3$ in the circuit 50 illustrated in FIGURE 6. The circuit 50 is identical to the circuit 10 except for the addition of resistor $R_2$ and the diode $D_3$. The operation of the circuit 50 is identical to that of the circuit 10 heretofore described. However, the diode $D_3$ insures a small voltage drop from base to emitter under what would otherwise be open base condition to insure thermal stability.

Figure 7:
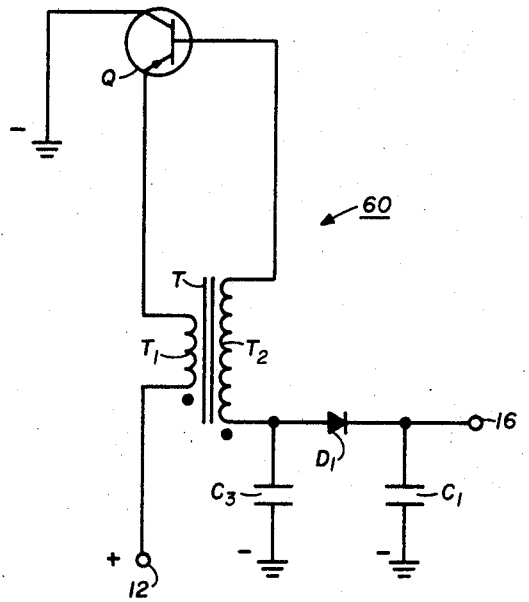
FIGURE 7 is a circuit diagram of yet another modification of the circuit of FIGURE 1 which is free-running and thermally stable.

Referring now to FIGURE 7, a preferred embodiment of the blocking oscillator power supply is indicated generally by the reference numeral 60. The system 60 is identical to the circuit 10 except for the addition of the capacitor $C_3$ which interconnects the base circuit between the secondary winding $T_2$ and the diode $D_1$ and ground, and corresponding components are therefore designated by corresponding reference characters. The capacitor $C_3$ solves the problem of thermal stability and also makes the blocking oscillator free-run. Assume first that no voltage is applied to the terminal 12 and that no charge is stored by either of the capacitors $C_1$ or $C_3$. When a positive voltage is applied to terminal 12, the transistor Q will fire as a result of the regenerative coupling between the emitter-collector circuit and the base circuit, and the base current will charge both capacitor $C_1$ and capacitor $C_3$. When the regenerative loop gain approaches unity, the flux in the transformer T collapses and the voltage impressed across capacitor $C_3$ and the flyback voltage induced in the secondary winding $T_2$ drive the base of the transistor Q well over its breakdown potential. Since there is no significant resistance in the base circuit whether completed through the emitter or collector, this action occurs so rapidly that very little power dissipation takes place within the transistor Q. Also, since this transient is in the back-bias direction, the transistor Q is driven rapidly to cut-off, thus assuring stable thermal characteristics as well. Further, the circuit 60 is free-running because of the resonant action of the capacitor $C_3$ with the transformer T such that the conduction pulse of the transistor Q will be repeated at a rate dependent upon the values of the capacitor $C_3$ and the inductance of the secondary winding $T_2$. This repetitive pulsing or free-running is desirable because when using cheaper components for the diode $D_1$ and transistor Q, it is possible for the charge on the capacitor $C_1$ to leak off and lockup the system if the capacitor $C_1$ is not fired at a sufficiently rapid rate. This is particularly true in ignition system applications as will hereafter be described in greater detail. When the blocking oscillator free-runs, however, the capacitor $C_1$ is repetitively charged so as to insure that it is continually charged to a maximum value.

Figure 8:
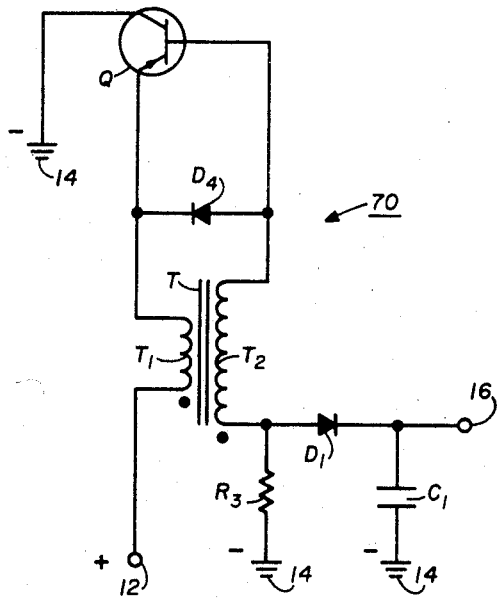
FIGURE 8 is a circuit diagram of still another modification of the circuit of FIGURE 1 which is free-running and thermally stable.

Another thermally stable, free-running embodiment of the blocking oscillator circuit of this invention is indicated generally by the reference numeral 70 in FIGURE 8. The circuit 70 is substantially identical to the circuit 40 and corresponding components are therefore designated by corresponding reference characters. In the circuit 70, however, the resistor $R_2$ is replaced by diode $D_4$ and a resistor $R_3$ connects the base circuit between the secondary winding $T_2$ and the diode $D_1$ to ground. The diode $D_4$ is reverse-biased during conductance of the transistor Q by the voltage induced in the secondary winding $T_2$ so that the gain required by the transistor Q is reduced to a minimum. The diode $D_4$ provides a low impedance path for the flyback voltage of the transformer T which is completed through the resistor $R_3$ and the power supply and at the same time back-biases the base-emitter of transistor Q. Since current can flow after the flux in the transformer collapses, as a result of the resistor $R_3$, the blocking oscillator will free-run.

Figure 9:
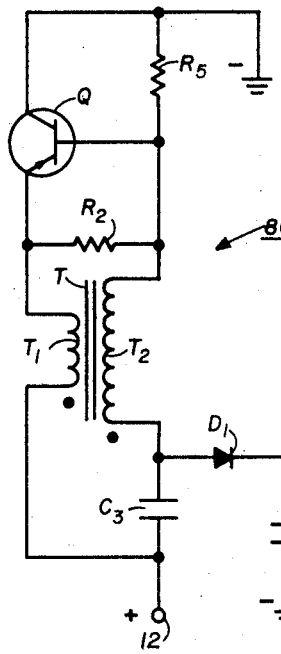
FIGURE 9 is a circuit diagram of yet another modification of the circuit of FIGURE 1 which is free-running and thermally stable.

Referring now to FIGURE 9, another blocking oscillator power supply constructed in accordance with the present invention is indicated generally by the reference numeral 80. The circuit 80 is similar to the circuits heretofore described and corresponding components are therefor designated with corresponding reference characters. The positive voltage terminal 12 is connected through the primary winding $T_1$ to the emitter of transistor Q. The collector of transistor Q is connected to ground. The base of transistor Q is connected through the secondary winding $T_2$ and the capacitor $C_3$ back to the positive terminal 12. The base is also connected through the secondary winding $T_2$ and the diode $D_1$ to charge the capacitor $C_1$ with respect to ground. The capacitor $C_1$ is discharged through output terminal 16. The resistor $R_2$ is connected from base to emitter of transistor Q to insure thermal stability as previously described. A resistor $R_5$ interconnects the base and collector of the transistor Q to insure that a base current will flow when the transistor is cold and initiate operation of the oscillator system.

When the terminal 12 is connected to a positive voltage, an emitter-base current flows through the primary winding $T_1$, the emiter-base of transistor Q and through either the resistor $R_5$ and the base circuit, or both. The regenerative feedback to the base-load circuit rapidly turns the transistor Q full "on" as previously described. This charges the capacitor $C_3$ directly and the capacitor $C_1$ through the diode $D_1$. When the gain of the regenerative feedback loop approaches unity, the flux of the transformer T collapses and the combined voltage of the capacitor $C_3$ and the flyback voltage in the secondary winding $T_2$ rapidly reverse-biases the transistor Q to breakdown. The capacitor $C_3$ is charged through the resistor $R_5$ such that the regenerative firing of the transistor Q can be repeated at intervals determined by the time-constant of the capacitor $C_3$, secondary winding $T_2$ and the resistor $R_5$. Each time that the transistor Q fires, the capacitor $C_3$ will be fully charged and the diode $D_1$ will conduct to the extent the voltage exceeds the voltage charge on the capacitor $C_1$. The capacitor $C_1$ may then be discharged at will through any suitable circuit connected to the output terminal 16.

The resistor $R_5$ insures that a sufficient base current will flow through the transistor Q in cold weather to start operation of the blocking oscillator. Once the transistor Q conducts, the transistor will be heated sufficiently to produce the necessary current to start the regenerative process through the secondary winding $T_2$. Either the resistor $R_5$ or the capacitor $C_3$ provides a means whereby base current can flow so that transistor Q can fire again even though the diode $D_1$ is back-biased by the charge of the capacitor $C_1$. The capacitor $C_3$ also provides a means for very rapidly back-biasing the transistor Q to reverse breakover so as to provide thermal stability as described in connection with the circuit 60.

Figure 10:
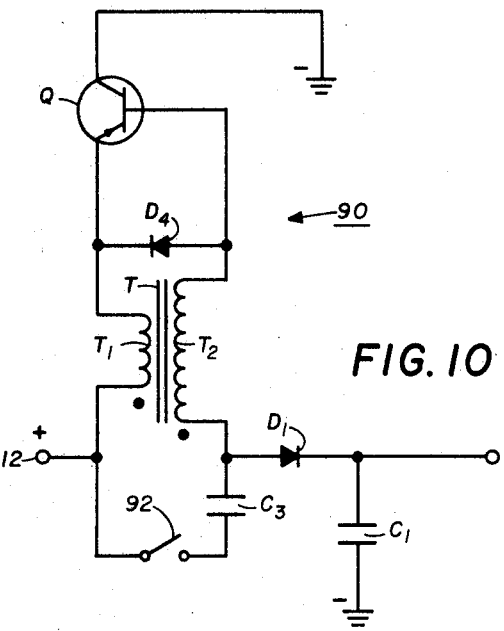
FIGURE 10 is a circuit diagram of a further modification of the circuit of FIGURE 1 which may be selectively made to free-run.

Referring now to FIGURE 10, another embodiment of the blocking oscillator circuit is indicated generally by the reference numeral 90. The circuit 90 is very similar to the circuit 80 except that the capacitor $C_3$ is connected through a switch 92 to the positive terminal 12 of the battery whenever the starter of an ignition system, for example, is energized, and diode $D_4$ from the circuit 70 is used instead of the resistor $R_2$ to provide thermal stability. The remaining components of the circuit 90 are the same as in the circuits heretofore described and are accordingly designated by corresponding reference characters.

When the terminal 12 is connected to the positive terminal of the battery, such as by the closing of the ignition switch of an automobile, current through the transistor Q causes current flow through the primary winding $T_1$, secondary winding $T_2$, diode $D_1$ and capacitor $C_1$ to ground. The voltage induced in the secondary winding $T_2$ rapidly turns the transistor Q on and the stepped-up voltage induced in the transformer $T_2$ charges the capacitor $C_1$ through the base and diode $D_1$ as heretofore described. When the flux of the transformer T collapses, the voltage induced in the secondary winding $T_2$ causes no current flow because of diode $D_1$ which also prevents discharge of the capacitor $C_1$. Since the diode $D_1$ is back-biased by the capacitor $C_1$, the transistor Q cannot fire again until the capacitor $C_1$ has been discharged. When the switch 92 is closed by energization of the starter of an engine, for example, the capacitor $C_3$ is connected through the switch 92 back to the positive terminal of the battery. This provides a path for sufficient base current to refire the transistor Q so that the blocking oscillator will free-run as described in connection with the circuit 80. The voltages impressed across the capacitor $C_3$ and the voltage induced in the secondary winding $T_2$ during collapse of the flux in the transformer are discharged primarily through the low resistance path offered by the diode $D_4$ and winding $T_1$. The diode $D_4$ also provides thermal stability for the transistor Q.

In accordance with an important aspect of this invention, the blocking oscillator power supply heretofore described in various embodiments is used in a capacitive discharge type electronic ignition system for an internal combustion engine.

Figure 11:
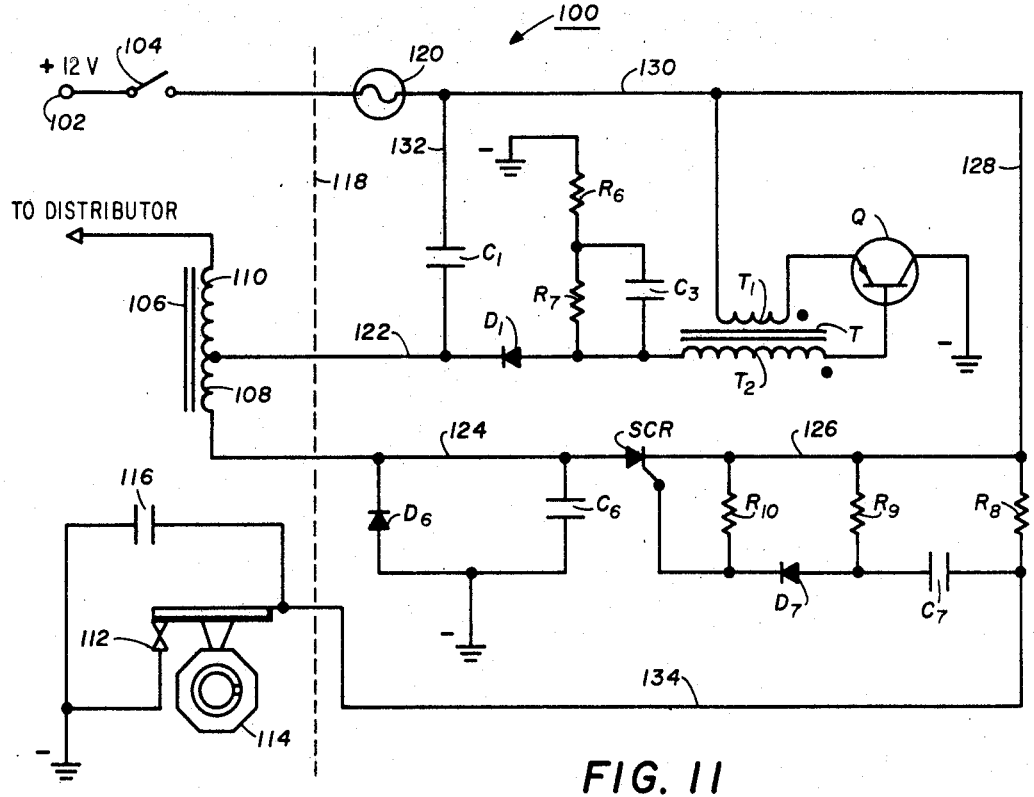
FIGURE 11 is a circuit diagram of a preferred embodiment of the ignition system of the present invention.

Referring now to FIGURE 11, a preferred embodiment of the present invention for an internal combustion engine is indicated generally by the reference numeral 100. As illustrated, the system 100 utilizes the components of the conventional automobile ignition system and for this reason might be considered as a hydrod system which may be operated in either the conventional or electronic mode. The conventional battery 102 and the ignition switch 104 are used. The ignition coil 106 which has a primary winding 108 and a secondary winding 110 which is connected through the conventional distributor (not illustrated) to the spark gaps of the several spark plugs is used, and the breaker point 112 which are operated by a timing cam 114, including the condenser 116 which is connected in shunt around the points 112 to prevent arcing of the points on the break, are used. The portion of the circuit to the left-hand side of the dotted line 118 is the conventional auto ignition system components.

The positive terminal of the battery 102 is connected through the ignition switch 104 and a fuse 120 to the primary winding $T_1$ of the transformer T of a blocking oscillator power supply identical to the circuit 60 except for the addition of resistors $R_6$ and $R_7$. When the ignition switch 104 is first closed, the transistor Q is very rapidly turned on due to the current in the primary winding $T_1$ which induces a greater voltage in the secondary winding $T_2$ of a polarity to turn on the transistor Q. The base current from the transistor Q charges the capacitor $C_1$ through the diode $D_1$ and also charges the capacitor $C_3$. When the losses of the charging circuit approach the gain of the regenerative feedback circuit, the flux in the transformer T collapses, reversing the polarity of the voltage on the secondary winding $T_2$. The voltage across the capacitor $C_3$ and the voltage across the secondary winding then reverse-biases the base of the transistor Q well over its breakdown potential described in the connection with the circuit 60. When the capacitor $C_3$ has discharged through the resistor $R_7$, the transistor Q fires again to repetitively charge the capacitor $C_1$ and maintain a high voltage charge on the capacitor $C_1$.

The capacitor $C_1$ is discharged through a loop including the conductor 122, the primary winding 108 of the ignition coil, conductor 124, an SCR, and conductors 126, 128, 130 and 132. The SCR is fired to discharge the capacitor in response to operation of the points 112 by a trigger circuit including the capacitor $C_7$ and diode $D_7$. A resistor $R_9$ connects the positive terminal 102 to the capacitor $C_7$ and diode $D_7$ such that when $C_7$ is being charged, diode $D_7$ is back-biased and the SCR is maintained "off" as the capacitor $C_7$ is charged. A resistor $R_{10}$ provides the conventional low impedance connection between the gate and cathode of the SCR. A ringback diode $D_6$ is connected between the primary winding 108 of the ignition coil and ground, and a capacitor $C_6$ is connected in parallel with the diode $D_6$ to assist in reverse-biasing the SCR to "cut-off" as will presently be described. The positive voltage of the battery 102 is connected through the ignition switch 104, fuse 120, conductor 130 and 128, resistor $R_8$, and conductor 134 and the points 112 to ground.

In one embodiment of the ignition system 100, the indicated components had the following values:

$C_1$—0.68 to 1.0μf., 600 v., Mylar or oil
$C_3$—0.01μf., 1 kv., disc ceramic
$C_6$—0.01μf., 1 kv., disc ceramic
$C_7$—0.01μf., 100 v., Mylar
$R_6$—10k., 2 w.
$R_7$—15k., 2 w.
$R_8$—50 ohms, 5 w.
$R_9$—10k., 0.5 w.
$R_{10}$—10 k., 0.5 w.
$D_1$—800 PIV, selected IN2071
$D_6$—600 PIV, 750 ma., IN2071
$D_7$—50–100 PIV
SCR—TI–3014, 400 v. @ 125° C.
T—6.3 v., CT, 2.5 a. (min.)
Q—TI–3027, 40 v.–7 a.
Fuse—5 amp.

When the ignition switch 104 is first closed, the transistor Q of the blocking oscillator power supply begins repetitively to fire and charge the capacitor $C_1$ to a very high voltage, for example 300 volts, due to the turns ratio of the transformer T as previously described. The repetition rate of the blocking oscillator circuit is determined by the values of $C_3$, $R_6$, $R_7$ and $C_1$, but is considerably faster than the rate at which the capacitor $C_1$ is discharged at high engine r.p.m. The capacitor $C_7$ is charged through resistor $R_9$. The gate of the SCR is not triggered.

As the engine is cranked and the points 112 open for the first time, the condenser 116 charges through resistor $R_8$ before capacitor $C_7$ has time to discharge, and the gate of the SCR is made positive relative to the cathode through the loop circuit including the resistor $R_8$, capacitor $C_7$ and diode $D_7$. This fires the SCR and discharges the capacitor $C_1$ through the primary winding 108 of the ignition coil thereby inducing a very high voltage in the secondary winding 110 of ignition coil 106 which is applied through the distributor to the appropriate spark plug where the power is dissipated at the spark gap. Due to the resonant circuit formed by the capacitor $C_1$ and the coil 106, a ringback voltage is applied to the anode of the SCR to cause cut-off. During the ringback, the ring-back diode $D_6$ conducts so as to partially recharge the capacitor $C_1$ and mainttin a reverse-bias on the SCR. The ring back voltage also induces a voltage in the secondary winding 110 of the ignition coil 106 and thereby contributes to and prolongs the power supplied to the spark gap.

Even if the points 112 bounce when closing the SCR cannot be re-fired because the capacitor $C_7$ has not yet been recharged since its charging time is primarily determined by its value and that of resistor $R_9$. It will also be noted that the capacitor $C_1$ is discharged through a loop connected back to the positive 12 volt terminal of the battery, rather than through the battery, so as to reduce radio interference. The diode $D_6$ is connected to ground such that a back-bias of 12 volts is maintained on the SCR during the ring-back period after the SCR fires. Capacitor $C_6$ minimizes the chance of erroneously firing the SCR from charging transients. The free-running operation of the blocking oscillator power supply including the transistor Q, transformer T, and capacitor resistor network $C_3$, $R_6$ and $R_7$ continually maintains the capacitor $C_1$ charged even during the cranking period when the discharge rate of the capacitor $C_1$ is relatively low. This permits the use of more inexpensive diodes and transistors in the circuit. Further, the back-biasing of the SCR during the ring-back period, together with the particular trigger circuit, permit the SCR to be relatively inexpensive. The resistor $R_8$ permits the current through the points 112 to be selected at such a level as to insure that the points will remain in a clean condition. Further, condenser 116 aids in burning off any oxide film or moisture which may have accumulated on the points.

Figure 12:
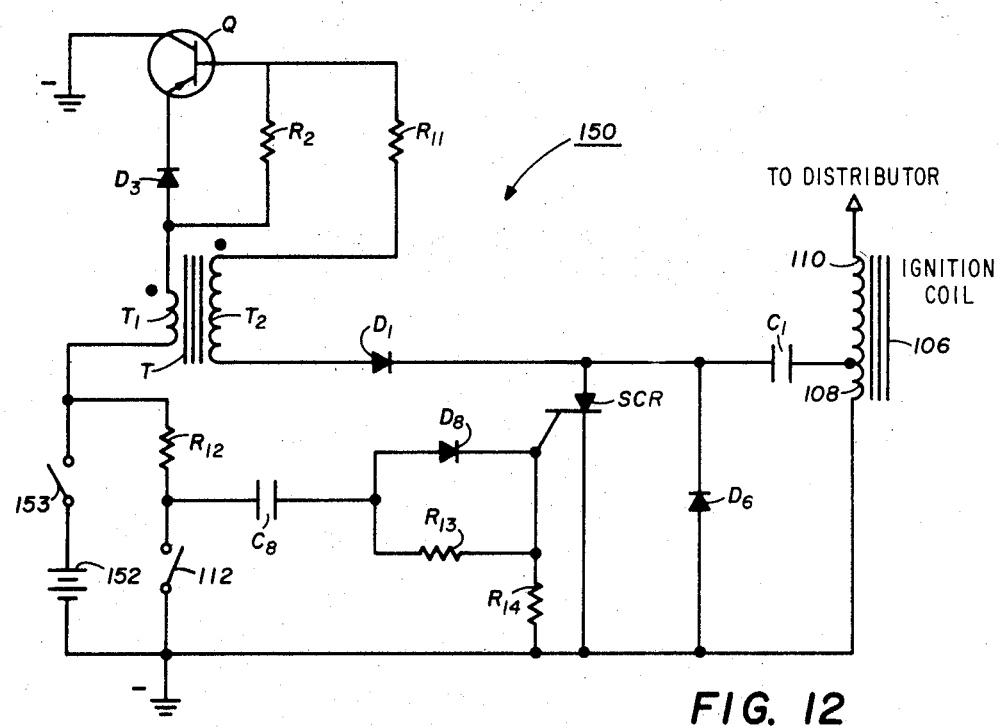
FIGURE 12 is a circuit diagram of another embodiment of the igination system of the present invention.

Referring now to FIGURE 12, another ignition system constructed in accordance with the present invention is indicated generally by the reference numeral 150. The ignition system 150 utilizes the blocking oscillator power supply 50 illustrated in FIGURE 5 with the addition of a current-limiting resistor $R_{11}$ in the base load circuit, and some components of the ignition system 100, and corresponding components are therefore designated by corresponding reference characters. The positive terminal of the automotive battery 152 is connected through an ignition switch 153, the primary winding $T_1$, and diode $D_3$ to the emitter of transistor Q. The collector of transistor Q is connected to ground. The resistor $R_2$ is connected between the base of the transistor Q and a point between the primary winding $T_1$ and the diode $D_3$. The base is also connected through a current-limiting resistor $R_{11}$, the secondary winding $T_2$ and the diode $D_1$ to charge the capacitor $C_1$. The capacitor-charging circuit is completed through the primary winding 108 of the automotive ignition coil 106 to ground.

The SCR is connected in a series discharge circuit including the primary winding 108 of the ignition coil and the capacitor $C_1$. The ringback diode $D_6$ is connected in shunt around the SCR and oriented in a reverse direction. A trigger network for firing the SCR includes the resistor $R_{12}$ which is connected in a series circuit across the battery 152 with the ignition points 112. A capacitor $C_8$ is connected through the points 112 to ground and to the gate of the SCR by a diode $D_8$ and a resistor $R_{13}$. A resistor $R_{14}$ interconnects the cathode and gate of the SCR.

In the operation of the circuit 150, the blocking oscillator power supply charges the capacitor $C_1$ to a high voltage through the primary winding 108 in the manner described in connection with the circuit 50. The emitter current induces a voltage in the secondary winding $T_2$ which draws the base of the transistor Q more negative and thereby very rapidly saturates the transistor Q. The base current passes through the diode $D_1$ and charges the capacitor $C_1$ with respect to ground through the primary winding 108 of the ignition coil 106. However, the capacitor $C_1$ does not charge at a sufficiently rapid rate to trigger the SCR. Once the capacitor $C_1$ is charged, the diode $D_1$ and base of the transistor Q are back-biased such that the oscillator cannot fire again until the capacitor $C_1$ has been discharged.

When the points 112 are closed, both plates of the capacitor $C_8$ are at ground potential by reason of the trigger circuit including the resistors $R_{13}$ and $R_{14}$ and the ignition points 112. When the ignition points open, a positive pulse is passed through the capacitor $C_8$ and diode $D_8$ and applied to the gate of the SCR to fire the SCR and discharge the capacitor $C_1$ through the primary winding 108 of the ignition coil 106. This induces a high voltage in the secondary winding 110 which is applied to the spark gap of the plug selected by the distributor. After the capacitor $C_1$ has discharged, the resonant circuit formed by the coil 106 and capacitor $C_1$ rings back to reverse-bias and quench the SCR. The ringback cycle also forward-biases the diode $D_6$ to partially recharge the capacitor $C_1$ and at the same time induces a second pulse in the secondary winding 110 to continue the power delivered to the spark gap. After the capacitor $C_1$ has been discharged, the transistor Q again begins to regeneratively conduct and recharge the capacitor $C_1$.

Figure 13:
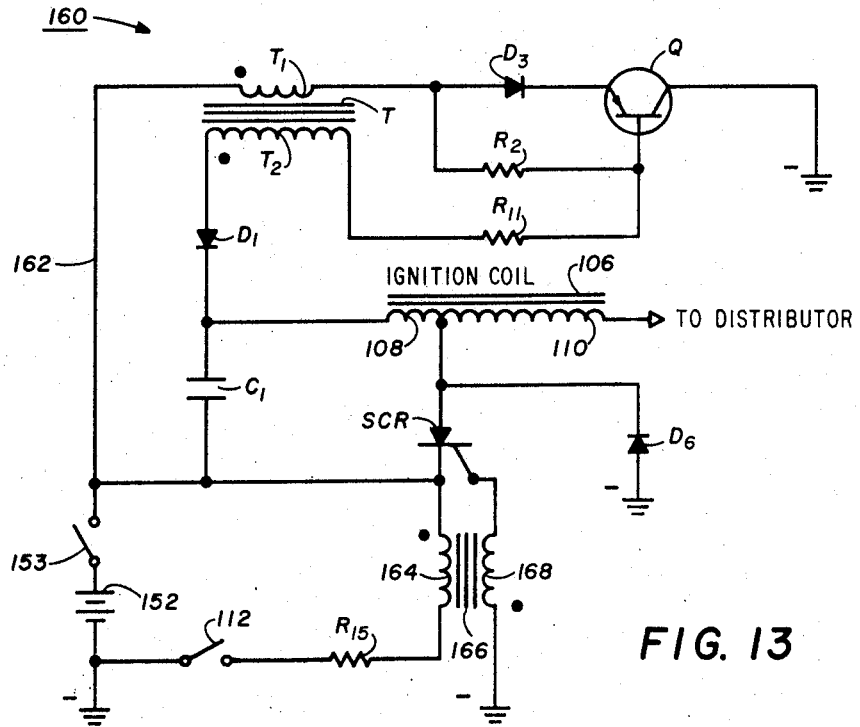
FIGURE 13 is a circuit diagram of yet another embodiment of the ignition system of the present invention.

Referring now to FIGURE 13, another ignition system constructed in accordance with the present invention is indicated generally by the reference numeral 160. The system 160 is similar to the system 150 and, accordingly, corresponding components are designated by corresponding reference characters. However, in the system 160 the capacitor $C_1$ is charged through a series circuit which does not include the primary winding 108 as in the system 150, but instead is connected back to the positive terminal of the battery 152 through the ignition switch 153. Thus the series charging circuit for the capacitor $C_1$ is comprised of the conductor 162, primary winding $T_1$, diode $D_3$, emitter-base diode of transistor Q, resistor $R_{11}$, secondary winding $T_2$ and diode $D_1$. The series discharge circuit for the capacitor $C_1$ is the same as in the circuit 150 and includes the primary winding 108 of the ignition coil 106 and the SCR. As in the circuit 150, the ringback diode $D_6$ interconnects the anode of the SCR and ground. The trigger circuit for the SCR is connected across the battery and includes the primary winding 164 of a transformer 166, a resistor $R_{15}$ and the ignition points 112. The gate of the SCR is connected through the secondary winding 168 of the transformer 166 to ground.

When the ignition switch 153 is closed, the capacitor $C_1$ is charged by the blocking oscillator power supply as heretofore described. It will be noted that the blocking oscillator power supply is not free-running. When the points 112 are closed, the current from the battery 152 through the primary winding 164 induces a voltage in the secondary winding 168 which makes the gate more negative than ground to insure that the SCR will remain "off." When the points open, the collapsing flux in the core of the transformer 166 drives the gate of the SCR positive with respect to the cathode to fire the SCR. This discharges the capacitor $C_1$ through the primary winding 108 and induces a high voltage in the secondary winding 110 which is applied to the proper spark plug by the distributor. After the capacitor $C_1$ has discharged, the ringback from the coil 106 and the capacitor reverse-biases the SCR to cut-off. The ringback diode $D_6$ conducts during the ringback of the discharge circuit to partially recharge the capacitor $C_1$ as heretofore described, and also maintains a reverse-bias of 12 volts across the SCR until the capacitor $C_1$ is recharged.

Referring now to FIGURE 14, another ignition system constructed in accordance with the present invention which provides a repetitive spark when the engine starter is energized is indicated generally by the reference numeral 180. The ignition system 180 is similar to the ignition systems heretofore described, and in particular uses the blocking oscillator power supply 50, and corresponding components are therefore indicated by corresponding reference characters. The terminal 182 of the automobile battery is connected through the ignition switch 184, the primary winding $T_1$, the diode $D_3$, the emitter-base diode of transistor Q, the secondary winding $T_2$, the diode $D_1$, the capaictor $C_1$, and the resistor $R_{16}$ back to ground, which is connected to the negative terminal of the battery. The blocking oscillator including the transistor Q and transformer T operate as heretofore described to charge the capacitor $C_1$ on a single-shot basis. The capacitor $C_1$ is discharged through a series discharge circuit including the primary winding 108 of the ignition coil 106 and the SCR. The ringback diode $D_6$ is connected between the cathode and anode of the SCR.

During normal engine operation, the SCR is fired by a trigger circuit extending from the ignition switch 184 through the resistor $R_{17}$, the capacitor $C_9$, and diode $D_8$ to the gate of the SCR. The ignition points 112 of the engine connect the junction between the resistor $R_{17}$ and capacitor $C_9$ to ground. The capacitor $C_{10}$ may comprise the conventional condenser connected across the breaker points of the automobile ignition system. A second switch 188 is closed by energization of the engine starter and, when closed, connects the positive terminal 182 through the resistor $R_{18}$ and the diode $D_9$ to the gate of the SCR. A resistor $R_{19}$ forms a voltage divider with the resistor $R_{18}$. A diode $D_{10}$ connects the resistor $R_{18}$ through the points 112 to ground.

When the ignition switch 184 is closed preparatory to starting the engine, the capacitor $C_1$ is charged to a high voltage depending upon the turns ratio of the transformer T by the blocking oscillator as heretofore described. When the starter is energized to start the engine, the switch 188 closes. If the points 112 are closed, the diode $D_{10}$ clamps the junction 190 to ground to prevent the application of a positive voltage to the gate of the SCR so that the capacitor $C_1$ will not be discharged. When the points 112 open, the positive voltage of the terminal 182 is applied to the divider $R_{18}$ and $R_{19}$ and, in turn, to the gate of the SCR through the diode $D_9$. This voltage remains on the diode $D_9$ until such time as the points close once again. When the positive voltage is applied to the gate of the SCR, the SCR is fired and the capacitor $C_1$ is discharged through the primary winding 108 of the ignition coil 106 to generate a very high voltage in the secondary winding 110 and to fire the spark plug selected by the distributor. After the capacitor $C_1$ has discharged, the ringback of the discharging circuit quenches the SCR while the ringback diode $D_6$ provides an additional pulse through the primary winding 108 which is applied to the spark plug and partially recharges the capacitor $C_1$. After the capacitor $C_1$ has been discharged, the transistor Q again fires to recharge the capacitor $C_1$. During the charging of the capacitor $C_1$, the charging current passing through the resistor $R_{16}$ reverse-biases the cathode of the SCR and the diode $D_9$ to maintain the gate negative with respect to the cathode of the SCR. As the capacitor $C_1$ becomes recharged, a point is reached where the voltage drop across the resistor $R_{16}$ is sufficiently low that the gate SCR becomes positive with respect to the cathode of the SCR through the diode $D_9$ and the SCR is fired again to dicharge the capacitor $C_1$ through the primary winding 108. Thus so long as the points 112 are open, the capacitor $C_1$ will be repeatedly charged and discharged through the primary winding 108 to produce a train of sparks across a gap of the spark plug to assist starting.

When the engine starts and the starter is de-energized, the switch 188 is opened. The ignition system 180 then generates only one spark (a portion of the spark being the ringback spark) each time the points 112 open. When the points 112 are closed, the capacitor $C_9$ is connected from ground to ground and is not charged. When the points open, a positive pulse from the terminal 182 is passed through the capacitor to fire the SCR and discharge the capacitor $C_1$. After the SCR is quenched by the ringback, the transistor Q again fires to recharge the capacitor $C_1$ and reverse-bias the SCR and diode $D_9$ to prevent re-firing as heretofore described. The SCR cannot be fired again until the points close and then open again because the capacitor $C_9$ provides an open circuit D.C.

From the above detailed description of several preferred embodiments of the invention, it will be appreciated that an ignition system has been described which delivers increased voltage and power to the spark gap sufficient to insure maximum engine power at high compression and high engine r.p.m. The current through the points may be selected at a sufficiently low value to reduce arcing and prolong point life, yet sufficiently high to insure that oxides and moisture will be burned through for starting the engine during adverse weather conditions. The preferred system 100 utilizes a free-running blocking oscillator power supply which is unusually simple and reliable, yet which charges the capacitor to a high voltage and maintains this charge. The system is fast so as to be fully operable at even extreme engine r.p.m. The system utilizes a high reliability trigger circuit to fire the SCR and discharge the capacitor. The high reliability of the trigger circuit together with the free-running oscillator permit the use of the relatively inexpensive circuit components so that a low cost can be achieved, and the simplicity of the system materially reduces the number of components. The system may be used in combination with a conventional ignition system and utilizes the components of the conventional system to further reduce cost. But more importantly, the conventional system, which is as yet unsurpassed in reliability, can be retained as a standby unit for use at the throw of a multicontact switch (not illustrated) which would be used to disconnect the conductors crossing the dotted line 118 in FIGURE 11, for example, and connect up the conventional system.

In other embodiments of the ignition system, a single-shot blocking oscillator power system has been used to charge the capacitor. In such a case, the current through the blocking oscillator is directly related to engine r.p.m. from zero r.p.m. up, such that an ammeter may be calibrated in r.p.m. to provide a tachometer. Another embodiment discloses a trigger circuit for the SCR which produces a train of sparks during start-up to promote easy starting. If desired, the oscillator power supply can similarly be made to free-run during start-up to insure that the capacitor remains fully charged, then reverted to single-shot mode when the starter is de-energized.

Several embodiments of the novel blocking oscillator power supply have been described. The power supply may be used to drive any load, but is particularly suited for charging capacitors. The power supply may be used to drive the load on either the forward conductance or flyback. The power supply may be thermally stabilized using conventional techniques, but is preferably stabilized and also made free-running by a capacitor which reverse-biases the base of the transistor on the flyback. This eliminates the need for any other circuit elements for thermal stabilization purposes.

Although several preferred embodiments of the invention have been described in detail, it is to be understood that various changes, substitutions and alterations can be made therein without departing from the spirit and scope of the invention as defined by the appended claims.

What is claimed is:
1. A blocking oscillator power supply system comprising:
  a transistor having an emitter, collector, and base;
  a voltage step-up transformer having a primary winding and a secondary winding, said primary winding being connected at one end to said emitter, said secondary winding being connected at one end to said base;
  a capacitive load connected to said secondary winding at the end opposite said base connection to define a load current loop comprising a source of electrical potential, said emitter and said base of said transistor, and said secondary winding;

said primary winding defining a current loop comprising said source of electrical potential, said emitter and said collector of said transistor, and excluding said capacitive load;

whereby said current loops are regeneratively coupled by said transformer to cause said transistor to rapidly fire to drive the load, then to block to shut-off when the gain of the regenerative feedback loop approaches unity.

2. A blocking oscillator power supply system as defined in claim 1 wherein:
the primary winding is connected between the power supply and the collector.

3. A blocking oscillator power supply system as defined in claim 1 wherein the load is primarily a resistive load.

4. A blocking oscillator power supply system as defined in claim 1 wherein the load is a capacitor and the second circuit means includes a diode connected to conduct during the firing of the transistor whereby the oscillator will only pulse one time to charge the capacitor, the diode will retain the charge on the capacitor, and the transistor will not fire again until the capacitor is discharged.

5. A blocking oscillator power supply system as defined in claim 1 wherein the second circuit means is connected back to the collector.

6. A blocking oscillator power supply system as defined in claim 1 wherein the second circuit means is connected back to the first circuit means between the power supply and the primary winding.

7. A blocking oscillator power supply system as defined in claim 1 further characterized by:
a diode connected between said secondary winding and said capacitive load to conduct during firing of the transistor, and
means connected around said diode for permitting collapse of the blocking flux in the transformer whereby the system will repetitively fire.

8. A blocking oscillator power supply system as defined in claim 7 wherein the third circuit means comprises a resistor connected in shunt around the diode and load back to the first circuit means.

9. A blocking oscillator power supply system as defined in claim 7 wherein said means comprises a capacitor connected in shunt around said diode and capacitive load back to said collector.

10. A blocking oscillator power supply system as defined in claim 1 wherein:
the second circuit means includes a diode connected to the base to conduct forward base current, a capacitor, and the secondary winding, and further characterized by
a third circuit means having a second load connected to the second circuit means between the diode and the first circuit means whereby the discharge of the capacitor and the flyback voltage induced in secondary winding will drive the second load.

11. A blocking oscillator power supply system as defined in claim 10 wherein:
the third circuit includes a second diode connected to conduct during the discharge of the capacitor in the second circuit and a second capacitor charged by current conducted by the second diode.

12. A blocking oscillator power supply system as defined in claim 10 wherein:
the second circuit means is connected back to the emitter and further characterized by
fourth circuit means connected around the secondary winding and capacitor in the second circuit to discharge both and permit free-running of the system.

13. A blocking oscillator power supply system as defined in claim 10 wherein:
the transformer is an autotransformer.

14. A blocking oscillator power supply system as defined in claim 1 wherein:
the second circuit means includes the secondary winding and a resistor, and further characterized by
third circuit means having a second load and connected in parallel with the resistance,
whereby the second load will be driven by the flyback voltage induced in the secondary winding and the system will be free-running.

15. A blocking oscillator power supply system as defined in claim 14 wherein:
the third circuit means includes a diode connected to conduct during the flyback period of the secondary winding and the load is a capacitor.

16. A blocking oscillator power supply system as defined in claim 14 wherein:
the third circuit means includes a diode connected to conduct during forward base current through the transistor and the load is a capacitor.

17. A blocking oscillator power supply system as defined in claim 1 further characterized by:
a resistor connected between the base and emitter of the transistor to thermally stabilize the transistor.

18. A blocking oscillator power supply system as defined in claim 1 further characterized by:
a diode connected between the power supply and the emitter to thermally stabilize the transistor.

19. A blocking oscillator power supply system as defined in claim 1 further characterized by:
a resistor connected between the base and collector for insuring a base current when the transistor is at low temperature whereby the oscillator will commence to free-run even in a cold ambient.

20. A blocking oscillator power supply system as defined in claim 1 wherein:
the second circuit means includes a diode connected between the secondary winding and the load,
the load is a capacitor, and further characterized by
third circuit means including switch means for selectively connecting the second circuit between the secondary winding and the diode to the first circuit means whereby the system will free-run when the switch means is closed.

21. A blocking oscillator power supply system as defined in claim 20 wherein:
the third circuit means includes a capacitor.

22. A blocking oscillator power supply system as defined in claim 21 wherein:
the third circuit means includes a resistor.

23. A blocking oscillator power supply system as defined in claim 21 wherein:
the third circuit means includes a resistor and a capacitor connected in parallel.

References Cited

UNITED STATES PATENTS

| | | | |
|---|---|---|---|
| 2,780,767 | 2/1957 | Janssen | 331—112 |
| 2,957,145 | 10/1960 | Bernstein | 331—112 |
| 2,977,549 | 3/1961 | Bernstein | 331—112 |
| 3,038,128 | 6/1962 | Fischman et al. | 331—112 |
| 3,066,265 | 11/1962 | Janssen et al. | 331—112 |
| 3,239,777 | 3/1966 | Mollo | 331—112 |
| 3,312,860 | 4/1967 | Sturm | 315—223 |

LAURENCE M. GOODRIDGE, Primary Examiner

U.S. Cl. X.R.

321—2; 331—112